O. G. SNIDER.
WEED CUTTER.
APPLICATION FILED NOV. 12, 1914.
1,219,875.
Patented Mar. 20, 1917.
2 SHEETS—SHEET 1.
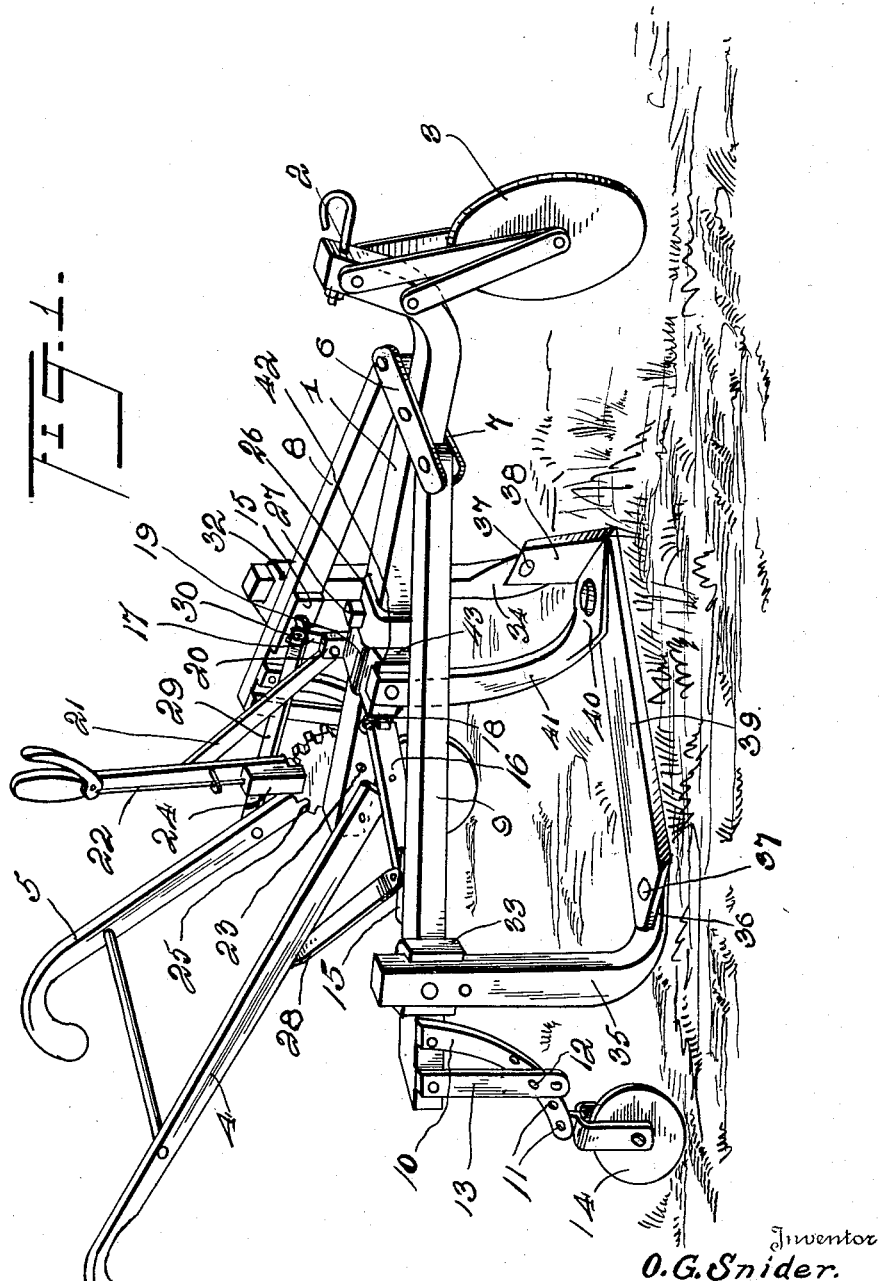
Witnesses
Inventor
O. G. Snider.
By
Attorney

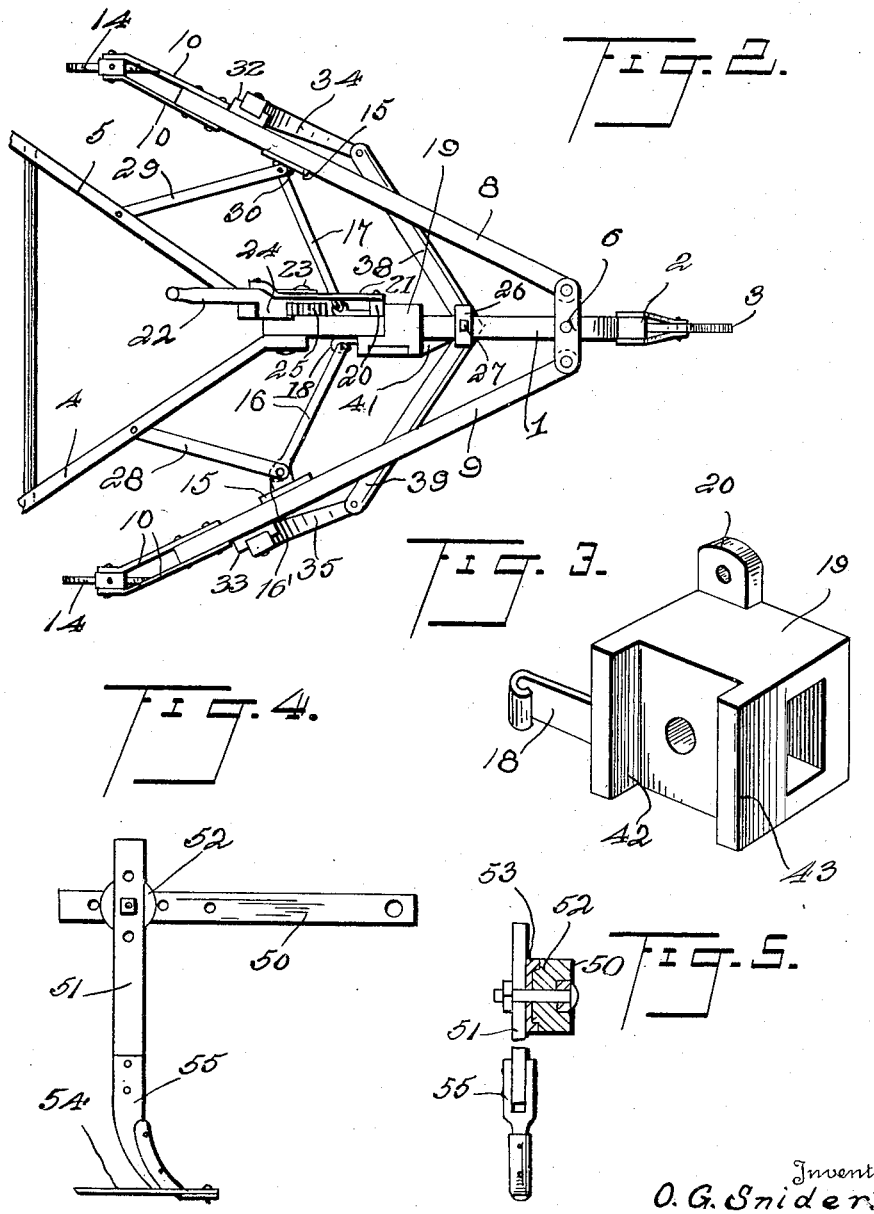

UNITED STATES PATENT OFFICE.

OTTO G. SNIDER, OF MUNCIE, INDIANA.

WEED-CUTTER.

1,219,875.  Specification of Letters Patent.  Patented Mar. 20, 1917.

Application filed November 12, 1914. Serial No. 871,769.

*To all whom it may concern:*

Be it known that I, OTTO G. SNIDER, a citizen of the United States, residing at Muncie, in the county of Delaware and State of Indiana, have invented certain new and useful Improvements in Weed-Cutters; and I do hereby declare the following to be a full, clear, and exact description of the invention, such as will enable others skilled in the art to which it appertains to make and use the same.

This invention relates to weed cutters and the primary object of the invention is the provision of a pair of blades disposed obliquely to the line of travel of a supporting structure for cutting weeds during the cultivation of various growing grains.

Another object of this invention is to adjustably support the obliquely disposed blades beneath a supporting structure, which latter structure is carried by swivel traction wheels.

A still further object of this invention is to connect side rails of the supporting frame pivotally to a center or central supporting bar or rail, and to slidably mount the central support of the cutting blades slidably upon the central rail and connect thereto a hand lever and also the pivoted side rails so that upon operation of the hand lever the side rails may be moved toward or from each other forcing forwardly or rearwardly the point of the oblique cutting blade for regulating the width of their cutting stroke.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:

Figure 1 is a perspective view of the improved weed cutter.

Fig. 2 is a top plan view of the cutter.

Fig. 3 is a perspective view of a block used in the construction of the weed cutter.

Fig. 4 is a side elevation of a modified form of the weed cutter, and

Fig. 5 is an edge view partially in section of the modified form illustrated in Fig. 4.

Referring more particularly to the drawings, 1 designates the central supporting bar of the weed cutter supporting structure which has its forward end 2 curved upwardly. The upwardly curved end 2 of the central supporting bar 1 has suspended therebeneath in any suitable manner a wheel 3 for engagement with the ground over which the weed cutter is traveling. The bar 1 has handles 4 and 5 secured to the sides of its rear end, which handles are of the ordinary construction and provided for manual movement or manipulation of the weeder for properly guiding the same.

The bar 1 has pivotally connected a short distance rearwardly of its upturned forward end a pair of bars 6 and 7, which bars have side rails 8 and 9 pivotally connected thereto adjacent their ends. The side rails 8 and 9 extend rearwardly from the bars 6 and 7 obliquely to the longitudinal line of the central supporting bar 1. The side rails 8 and 9 have arcuate bracket arms 10 pivotally secured thereto adjacent their rear ends, which arms are provided with a plurality of longitudinally spaced openings. The openings 11 are provided for receiving pins 12 which are carried by vertical arms 13. The arms 13 are pivotally secured to the ends of the side rails and depend therefrom, and by inserting the pin 12 which is carried thereby through any one of the openings 11 the elevation and position of the wheels 14, which are carried by the arcuate arms 10 is regulated. The wheels 14 are swivelly connected to the arms 10 so as to permit of their free movement over rough ground. The side rails 8 and 9 have bearing brackets 15 secured to their inner surfaces a short distance inwardly from their rear ends, to which brackets are pivotally connected bars 16 and 17. The bars 16 and 17 have their inner ends which extend toward the central supporting bar 1, pivotally connected as at 18 to a block 19. The block 19 is slidably mounted upon the supporting bar 1 of the weeder supporting frame and it has an upstanding ear 20 formed upon one side thereof, to which ear is connected a bar 21. The bar 21 extends rearwardly and upwardly at an incline from the ear 20 and is connected to a hand lever 22 which is pivotally mounted upon a pin 23 carried by the central supporting bar 1. The lever 22 has a dog mechanism 24 of the ordinary construction carried thereby, which coacts with a quadrant 25, for holding the lever in various adjusted positions. The oscillatory movement of the lever 22 will slide the block 19 forwardly or rearwardly upon the central supporting bar 1 and through the pivotal connection between the side rails 8 and 9 and the block 19 the side rails will be moved inwardly toward or outwardly from the central supporting bar 1 upon movement of the hand lever and sliding movement of the block, depending upon the direction in which the block is moved upon the central supporting bar. The strap or block 26 is also slidably mounted upon the central supporting bar 1 forwardly of the block 19 and has a set screw 27 carried thereby for engagement with the central supporting bar for holding the strap or block 26 in various adjusted positions for limiting the forward movement of the block 19.

The handles 4 and 5 are braced by bars 28 and 29 which are securely attached to the outer sides of the handles and loosely connected to the pins 30 which are seated in the bearings 16' formed on the bearing bracket 15. The side rails 8 and 9 have detachably secured to their outer surfaces a short distance forwardly of the arcuate bracket arm 10 channeled blocks 32 and 33 respectively, which channeled blocks have seated therein the upper ends of downwardly extending arms 34 and 35. The arms 34 and 35 have their lower ends curved forwardly and reduced in thickness as is indicated at 36 in Fig. 1 of the drawings. The ends which extend substantially horizontally and forwardly of the vertical portions of the arms 34 and 35 are reduced in thickness with respect to the vertical portion of the arm and have secured thereto by bolts or other suitable fastening means 37, cutting blades 38 and 39. The blades 38 and 39 extend forwardly from the arms 34 and 35 and have their forward ends converging and secured to the substantially horizontal portion 40 of an arm 41. The arm 41 is mounted in a facial recess 42 which is formed in an extension 43 formed on the block 19 so that the arm 41 will move synchronously with the movement of the block 19. The blades 38 and 39 are pivotally connected to the horizontal portion 40 of the arm 41 so that they will move correspondingly with the movement of the side rails 8 and 9, causing their outer ends which are connected to the arms 34 and 35 to move inwardly toward each other as their ends which are connected to the arm 41 move forwardly upon the sliding movement of the block 19, and when the block 19 is forced rearwardly upon the supporting bar 1 the arms 34 and 35 will move from each other increasing the cutting scope of the blades, by increasing the distance from their outer terminal end.

In Figs. 4 and 5 of the drawings a modified form of the weed cutter is shown which comprises a bar 50 which is adapted for connection to gangs of an ordinary cultivator. The bar 50 has connected thereto a vertical bar 51, by means of a pair of circular disks 52 and 53. The circular disks 52 and 53 permit of a varying of the degree of the angle between the bars 50 and 51 for regulating the proper positioning of sweep blade 54 which is carried by the lower end of the arm 51. The sweep blade 54 is connected to the bar 51 by a socket member 55 as is clearly shown in Fig. 5 of the drawings.

From the foregoing description taken in connection with the accompanying drawings the advantages of construction and of the method of operation of the improved weed cutter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a weed cutter, a central supporting bar, a pair of side rails pivotally connected at their forward ends to said central supporting bar, a block slidably mounted upon said central supporting bar, said side rails being pivotally associated with said block for movement toward or from said central supporting bar upon sliding movement of said block upon said bar, depending arms detachably carried by said side rails adjacent their rear ends, a depending arm carried by said block, a pair of cutting blades pivotally connected to said block carried depending arm and extending outwardly therefrom obliquely to the longitudinal lines of said central bar, said cutting blades being pivotally secured to said side rail carried depending arms for movement synchronously with said rails for increasing or decreasing their cutting scope with relation to the ground, and means connected to the rear end of said side rails for supporting the same and means connected to the rear end of the supporting bar and pivotally connected to the upper face of said sliding block for changing the inclination of the cutting blades with relation to the ground.

2. In a weed cutter, a central supporting bar, a pair of cross bars pivoted intermediate their ends adjacent the forward end of said central supporting bar, a pair of side rails pivotally connected at their forward ends to the cross bars, and extending rearwardly therefrom, a block slidably mounted upon said central supporting bar, bars pivotally connected at one end to the inner face of the side rails and the opposite ends pivotally connected to the block, said side rails having supporting means at their rear end, said side rails also adapted to be moved toward or from said central supporting bar upon sliding movement of said block upon said bar, depending arms detachably carried by said side rails adjacent their rear ends, a depending arm carried by said block, a pair of cutting blades pivotally connected to said block carried depending arm and extending outwardly therefrom obliquely to the longitudinal lines of said central bar, said cutting blades being pivotally connected to said rail carried depending arms for movement synchronously with said rails for increasing or decreasing their cutting scope, a lever pivotally mounted to the rear end of said central supporting bar, and means connected to said lever and said sliding block for changing the cutting scope of said cutting blades upon movement in either direction.

3. In a weed cutter, a central supporting bar, a pair of side rails, said side rails pivotally connected at their forward ends near the forward end of the central supporting bar, arcuate arms pivoted to the rear ends of said side rails, wheels pivotally carried by the lower terminals of said arcuate arms, and depending arms pivotally connected to said side rails and adjustably connected to the arcuate arms, for regulating the position of said wheels with relation to the arms, said side rails and central bar carrying cutting blades.

In testimony whereof I affix my signature in presence of two witnesses.

OTTO G. SNIDER.

Witnesses:
JOHN A. SNIDE,
WILBER E. SUTTON.

Copies of this patent may be obtained for five cents each, by addressing the "Commissioner of Patents, Washington, D. C."